(12) United States Patent
Jiang et al.

(10) Patent No.: US 12,493,422 B2
(45) Date of Patent: Dec. 9, 2025

(54) RESOURCE ALLOCATION METHOD AND APPARATUS

(71) Applicant: Huawei Technologies Co., Ltd., Shenzhen (CN)

(72) Inventors: Zhou Jiang, Chengdu (CN); Zhuo Cheng, Zürich (CH); Haitao Shi, Chengdu (CN); Yuanyuan Wang, Chengdu (CN); Weijie Xiang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/419,111

(22) Filed: Jan. 22, 2024

(65) Prior Publication Data
US 2024/0201880 A1     Jun. 20, 2024

Related U.S. Application Data

(63) Continuation of application No. PCT/CN2022/082051, filed on Mar. 21, 2022.

(30) Foreign Application Priority Data

Jul. 23, 2021   (CN) .......................... 202110838151.4

(51) Int. Cl.
*G06F 3/06* (2006.01)
(52) U.S. Cl.
CPC .......... *G06F 3/0631* (2013.01); *G06F 3/0604* (2013.01); *G06F 3/0644* (2013.01); *G06F 3/067* (2013.01)

(58) Field of Classification Search
CPC .... G06F 3/0631; G06F 3/0604; G06F 3/0644; G06F 3/067
See application file for complete search history.

(56) References Cited

U.S. PATENT DOCUMENTS 5,394,531 A * 2/1995 Smith .................... G06F 12/126
711/E12.071
5,537,635 A * 7/1996 Douglas .............. G06F 12/0866
710/33

(Continued)

FOREIGN PATENT DOCUMENTS

| CN | 102521153 A | 6/2012 |
| CN | 103885838 A | 6/2014 |

(Continued)

*Primary Examiner* — Ryan Bertram
(74) *Attorney, Agent, or Firm* — Conley Rose, P.C.

(57) ABSTRACT

A resource allocation method includes a processor that outputs a first model based on a page resource allocated to each cache object and a data read hit ratio of the cache object, where the page resource allocated to each cache object is from a memory pool provided by a storage system. The first model indicates a page resource to be allocated to the cache object when a specific hit ratio is met. The processor outputs a second model based on the first model corresponding to each cache object, where the second model indicates a target page resource to be allocated to each cache object. The processor adjusts, based on the second model, the page resource allocated to each cache object. The processor adjusts the page resource of the cache object based on the second model.

20 Claims, 5 Drawing Sheets

Curve chart

(56) References Cited

U.S. PATENT DOCUMENTS

| | | | |
|---|---|---|---|
| 2015/0363236 A1* | 12/2015 | Manpathak | G06F 12/0871 |
| | | | 711/160 |
| 2016/0117241 A1 | 4/2016 | Shah et al. | |
| 2017/0139610 A1* | 5/2017 | Choi | G06F 16/2455 |
| 2018/0188989 A1* | 7/2018 | Nachimuthu | G06F 12/0607 |
| 2019/0155638 A1* | 5/2019 | Asadi | G06F 9/45558 |
| 2022/0188235 A1* | 6/2022 | Gupta | G06F 12/0848 |

FOREIGN PATENT DOCUMENTS

| | | |
|---|---|---|
| CN | 111258927 A | 6/2020 |
| CN | 111737168 A | 10/2020 |

* cited by examiner

RESOURCE ALLOCATION METHOD AND APPARATUS

CROSS-REFERENCE TO RELATED APPLICATIONS

This is a continuation of International Patent Application No. PCT/CN2022/082051 filed on Mar. 21, 2022, which claims priority to Chinese Patent Application No. 202110838151.4 filed on Jul. 23, 2021. The disclosures of the aforementioned applications are hereby incorporated by reference in their entireties.

TECHNICAL FIELD

This disclosure relates to the field of data storage, and in particular, to a resource allocation method and an apparatus.

BACKGROUND

A memory is a communication bridge between a processor and a hard disk in a storage system. The memory is configured to temporarily store computing data in the processor and data exchanged between the processor and an external memory such as the hard disk. One or more memories in the storage system may be virtualized as a memory pool. The memory pool is configured to store a plurality of cache objects needed by a service, for example, a data read cache and a metadata cache (or pool cache).

Usually, the processor may evenly allocate page resources needed by a plurality of cache objects based on remaining resources of the memory pool. However, if the remaining resources in the memory pool are insufficient, the processor evicts data stored in the plurality of cache objects in the same proportion, and reclaims a page resource occupied by the data. Consequently, a hit ratio of a cache object with a large page resource requirement is reduced. Then, an overall hit ratio of the memory is reduced, and a service processing delay is increased. Therefore, how to manage a memory resource becomes an urgent problem that needs to be resolved.

SUMMARY

This disclosure provides a resource allocation method and an apparatus, to resolve a problem that a hit ratio of a cache object with a large page resource requirement is reduced, an overall hit ratio of a memory is reduced, and a service processing delay is increased.

To achieve the foregoing objective, the following technical solutions are used in this disclosure.

According to a first aspect, this disclosure provides a resource allocation method. The method may be applied to a storage system, or the method may be applied to a computing device that can support the storage system in implementing the method. For example, the computing device includes a chip system. The resource allocation method includes a processor that outputs a first model based on a page resource allocated to each cache object and a data read hit ratio of the cache object, where the page resource allocated to each cache object is from a memory pool provided by the storage system, and the first model indicates a page resource that needs to be allocated to the cache object when a specific hit ratio is met, the processor outputs a second model based on the first model corresponding to each cache object, where the second model indicates a target page resource allocated to each cache object, and the processor adjusts, based on the second model, the page resource allocated to each cache object.

In the resource allocation method provided in this embodiment of this disclosure, the processor may use the first model to determine the page resource that is determined when each cache object meets the specific hit ratio, and use the second model to determine the target page resource to be allocated to each cache object. This helps the processor adjust the page resource of the cache object based on the second model, and avoids that the processor evenly allocates or evicts the page resource of the cache object, thereby improving utilization of the page resource in the memory pool, improving allocation rationality of the page resource in the memory pool, and reducing a service processing delay.

It should be noted that the resource allocation method may be performed by the processor of the storage system, or may be performed by the computing device that communicates with the storage system. If the foregoing resource allocation method is executed by the computing device that communicates with the storage system, consumption of a computing resource in the storage system can be reduced, and a data read and write speed of the storage system can be improved. In addition, because the computing resource of the computing device is adjustable, for example, a user may insert computing devices with different processing capabilities into the storage system, compared with the processor in the storage system, the computing device can allocate a resource more quickly, thereby reducing time needed for resource allocation and reducing the service processing delay.

In the following implementations, the resource allocation method executed by the processor of the storage system is provided as an example.

In an optional implementation, the cache object is a memory space allocated from the memory pool, and the memory space is provided to be used by a specific type of data.

In another optional implementation, that the processor outputs a second model based on the first model corresponding to each cache object includes that the processor obtains a weight value corresponding to each cache object, where one weight value corresponds to one cache object, and the processor outputs the second model based on the first model corresponding to each cache object and the weight value corresponding to the cache object. The processor introduces the second model of the memory pool. The second model indicates the target page resource to be allocated to each cache object. The processor may allocate page resources for a plurality of cache objects corresponding to the service based on the second model, so as to avoid that the processor allocates or evicts the page resource of the cache object based on a same proportion, thereby improving an overall hit ratio of a memory and reducing the service processing delay.

In another optional implementation, that the processor obtains a weight value corresponding to each cache object includes that the processor obtains statistical information, where the statistical information includes bandwidth and a processing delay of the memory pool, and the processor determines, based on the statistical information, the weight value corresponding to each cache object. The processor may update the second model based on the statistical information of the service executed by the storage system. This helps improve accuracy of the second model, so that the processor allocates the page resource of the memory pool more properly, thereby improving the overall hit ratio of the memory pool and reducing the service processing delay.

In another optional implementation, that the processor outputs a first model based on a page resource allocated to each cache object and a data read hit ratio of the cache object includes that the processor obtains status information of the cache object, where the status information includes a combination of at least one or more of a reuse distance, memory eviction information, and historical information. The historical information includes a correspondence that is between a page resource allocated to the cache object and a data read hit ratio of the cache object that exists in an execution process of a historical service, and the processor creates the first model based on the status information.

In another optional implementation, that the processor creates the first model based on the status information includes that the processor creates a first curve based on the reuse distance, where the first curve indicates a correspondence that is between a page resource allocated to the cache object and a data read hit ratio and that is obtained according to a first algorithm, the processor creates a second curve based on memory eviction information, where the second curve indicates a correspondence that is between a page resource of the cache object and a data read hit ratio that exists after a part of a page resource allocated to the cache object is evicted, the processor creates a third curve based on the historical information, and the processor creates the first model based on at least one of the first curve, the second curve, and the third curve. In the resource allocation method provided in this embodiment of this disclosure, first, the processor may obtain the status information of the cache object, where the status information includes the combination of at least one or more of the reuse distance, the memory eviction information, and the historical information, second, the processor may obtain the plurality of types of curves based on the status information, and finally, the processor obtains the first model of the cache object based on a combination of at least one or more of the plurality of types of curves.

In this way, the processor not only uses a theoretical hit ratio of a cache object with a specific page resource, but also uses the memory eviction information and the historical information of the cache object in the service execution process. This improves accuracy of describing the page resource and the hit ratio (for example, the first model) of the cache object by the processor, thereby improving the accuracy of the second model. This helps the processor determine a target page resource of the cache object based on the service request and the second model, thereby improving memory resource utilization and memory resource allocation rationality, and reducing the service processing delay.

In another optional implementation, that the processor adjusts, based on the second model, the page resource allocated to each cache object includes that the processor obtains the first information of each cache object, where the first information indicates at least one of a priority or a hotspot requirement of the cache object, and the processor adjusts, based on the first information and the second model, the page resources allocated to each cache object. The processor may determine priority information of a cache object that needs to be accessed by a service, based on levels of cache objects (inherent priorities of the cache objects) and hotspot requirements of cache objects corresponding to different services. Therefore, in the process of allocating the page resource to the cache object by the processor, the processor may preferentially allocate more page resources to a cache object with the hotspot requirement, thereby improving the overall hit ratio of the memory pool, and reducing the service processing delay.

In another optional implementation, the resource allocation method further includes that the processor obtains a service request, and a cache object needed by the service request includes another cache object that is not provided by the memory pool, and writes the other cache object into the memory pool based on the service request. In this way, based on the service request, the processor may add a new cache object to the memory pool, or remove an old cache object from the memory pool, so as to avoid that a cache object included in a memory pool in a storage system cannot be added or cancelled in a common technology, thereby implementing dynamic adaptation of the memory pool in the storage system, and improving memory utilization of the storage system.

According to a second aspect, this disclosure further provides a resource allocation apparatus. The resource allocation apparatus includes modules configured to execute the resource allocation method in any one of the first aspect or the possible implementations of the first aspect.

For beneficial effects, refer to descriptions in any aspect in the first aspect. Details are not described herein again. The resource allocation apparatus has a function of implementing behavior in a method instance in any aspect in the first aspect. The function may be implemented by hardware, or may be implemented by corresponding software executed by the hardware. For example, the resource allocation apparatus may be used in a storage system or a computing device that communicates with the storage system.

The hardware or software includes one or more modules corresponding to the foregoing functions. In a possible design, the storage system includes a plurality of cache objects. The resource allocation apparatus includes a first generation unit configured to output a first model based on a page resource allocated to each cache object and a data read hit ratio of the cache object, where the page resource allocated to each cache object is from a memory pool provided by the storage system, and the first model indicates a page resource that needs to be allocated to the cache object when a specific hit ratio is met, and a second generation unit configured to output a second model based on the first model corresponding to each cache object, where the second model indicates a target page resource to be allocated to each cache object, and an allocation unit configured to adjust, based on the second model, the page resource allocated to each cache object.

In an optional implementation, the cache object is a memory space allocated from the memory pool, and the memory space is provided to be used by a specific type of data.

In another optional implementation, the second generation unit is further configured to obtain a weight value corresponding to each cache object, where one weight value corresponds to one cache object, and the second generation unit is further configured to output the second model based on the first model corresponding to each cache object and the weight value corresponding to the cache object.

In another optional implementation, the second generation unit is further configured to obtain statistical information, where the statistical information includes bandwidth and a processing delay of the memory pool, and the second generation unit is further configured to determine, based on the statistical information, the weight value corresponding to each cache object.

In another optional implementation, the first generation unit is further configured to obtain status information of the cache object, where the status information includes a combination of at least one or more of a reuse distance, memory eviction information, and historical information. The historical information includes a correspondence that is between a page resource allocated to the cache object and a data read hit ratio of the cache object and that exists in an execution process of a historical service, and the first generation unit is further configured to create the first model based on the status information.

In another optional implementation, the first generation unit is further configured to create a first curve based on the reuse distance, where the first curve indicates a correspondence that is between a page resource allocated to the cache object and a data read hit ratio and that is obtained according to a first algorithm, the first generation unit is further configured to create a second curve based on the memory eviction information, where the second curve indicates a correspondence that is between a page resource of the cache object and a data read hit ratio and that exists after a part of a page resource allocated to the cache object is evicted, the first generation unit is further configured to create a third curve based on the historical information, and the first generation unit is further configured to create the first model based on at least one of the first curve, the second curve, and the third curve.

In another optional implementation, the allocation unit is further configured to obtain first information of each cache object, where the first information indicates at least one of a priority or a hotspot requirement of the cache object, and the allocation unit is further configured to adjust, based on the first information and the second model, the page resource allocated to each cache object.

In another optional implementation, the resource allocation apparatus further includes a communication unit configured to obtain a service request, where a cache object needed by the service request includes another cache object that is not provided by the memory pool, and a processing unit configured to write the other cache object into the memory pool based on the service request.

In another optional implementation, the resource allocation apparatus is further used in a computing device that communicates with the storage system.

According to a third aspect, this disclosure further provides a storage system. The system includes a processor, a memory, and a hard disk. The processor is configured to perform an operation step of the method in any one of the first aspect or the possible implementations of the first aspect. At least one of the memory and the hard disk may be virtualized as a memory pool in any one of the first aspect or the possible implementations of the first aspect.

According to a fourth aspect, this disclosure further provides a resource allocation system, where the resource allocation system includes modules configured to execute the resource allocation method in any one of the first aspect or the possible implementations of the first aspect.

For beneficial effects, refer to descriptions in any aspect in the first aspect. Details are not described herein again. The resource allocation system has a function of implementing behavior in a method instance in any aspect in the first aspect. The function may be implemented by hardware, or may be implemented by corresponding software executed by the hardware. For example, the foregoing hardware or software includes one or more modules corresponding to the foregoing function. In a possible design, the resource allocation system includes a storage system and a computing device, the computing device communicates with the storage system, and the storage system includes a plurality of cache objects.

The computing device is configured to output a first model based on a page resource allocated to each cache object and a data read hit ratio of the cache object, where the page resource allocated to each cache object is from a memory pool provided by a storage system, and the first model indicates a page resource that needs to be allocated to the cache object when a specific hit ratio is met. The computing device is further configured to output a second model based on the first model corresponding to each cache object, where the second model indicates a target page resource to be allocated to each cache object. The computing device is further configured to adjust, based on the second model, the page resource allocated to each cache object.

According to a fifth aspect, this disclosure further provides a computing device, including a processor and an interface circuit. The interface circuit is configured to receive a signal from another computing device and transmit the signal to the processor, or send a signal from the processor to another computing device. The processor is configured to implement an operation step of the method in any one of the first aspect or the possible implementations of the first aspect by using a logic circuit or executing code instructions.

According to a sixth aspect, this disclosure provides a computer-readable storage medium, where the storage medium stores a computer program or instructions, and when the computer program or the instructions are executed, an operation step of the methods in the foregoing aspects or the possible implementations of the foregoing aspects is implemented.

According to a seventh aspect, this disclosure provides a computer program product, where the computer program product includes instructions, and when the computer program product runs on a computing device or a processor, the computing device or the processor executes the instructions, to implement an operation step of the method in any one of the foregoing aspects or the possible implementations of the foregoing aspects.

According to an eighth aspect, this disclosure provides a chip, including a memory and a processor. The memory is configured to store computer instructions, and the processor is configured to invoke the computer instructions from the memory and run the computer instructions, to implement an operation step of the method in any one of the foregoing aspects or the possible implementations of the foregoing aspects.

In this disclosure, based on the implementations according to the foregoing aspects, the implementations may be further combined to provide more implementations.

DESCRIPTION OF EMBODIMENTS

For clear and brief description of the following embodiments, a related technology is briefly described first.

Figure 1:
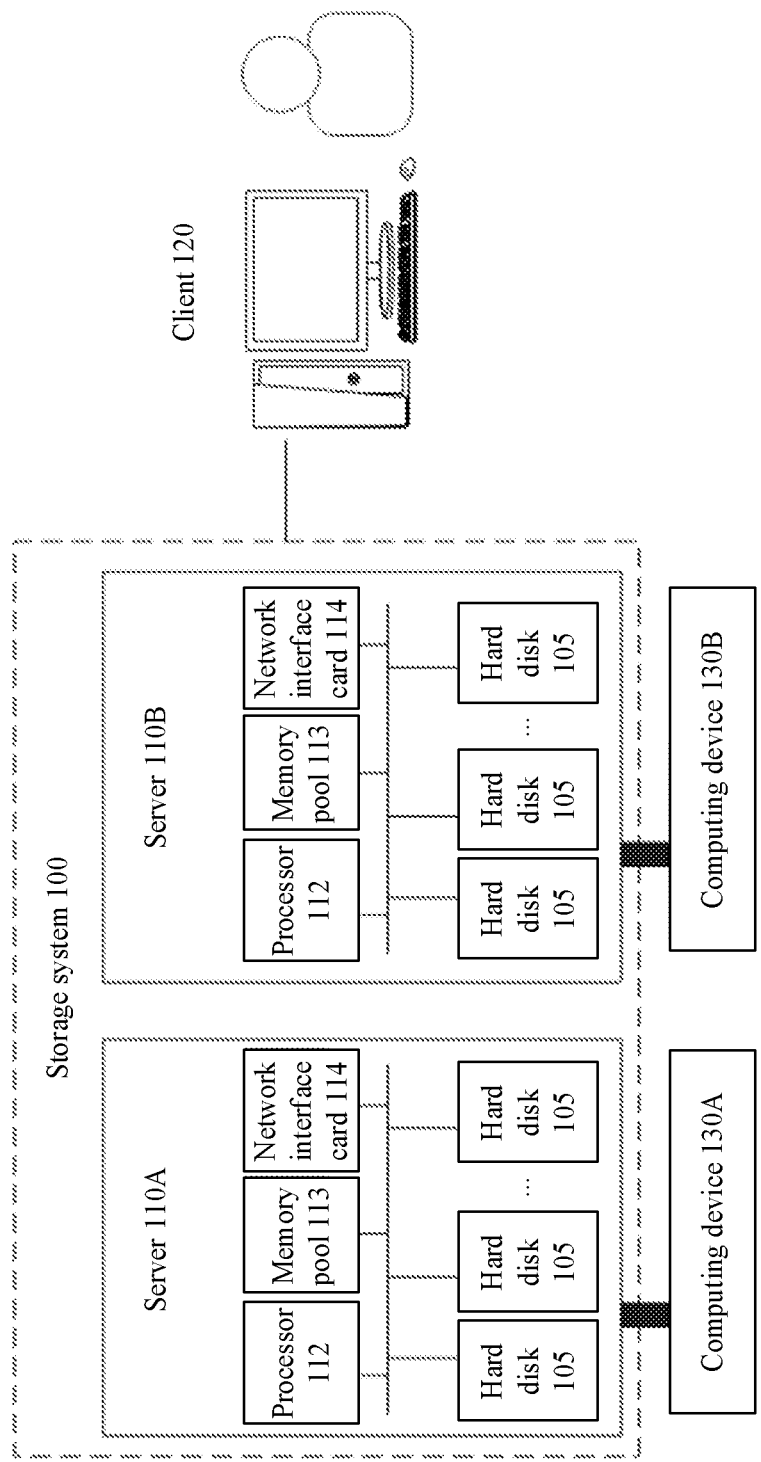
FIG. 1 is a schematic diagram of a structure of a resource allocation system according to this disclosure.

FIG. 1 is a schematic diagram of a structure of a resource allocation system according to this disclosure. The resource allocation system includes a storage system 100, a client 120, and at least one computing device. The storage system 100 includes at least one server. The client 120 may access the server in the storage system 100 through a network to access data. A communication function of the network may be implemented by a switch or a router. In a possible example, the client 120 may alternatively communicate with the server through a wired connection, for example, a Peripheral Component Interconnect Express (PCIe) high-speed bus.

The computing device may be externally connected to a server. As shown in FIG. 1, a computing device 130A is installed on a server 110A, and a computing device 130B is installed on a server 110B. A server or a network interface card may offload a data processing process to the computing device. The computing device may include one or more processing units. The processing unit may be a central processing unit (CPU), another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any regular processor or the like. Alternatively, the computing device may be a dedicated processor for artificial intelligence (AI), for example, a neural processing unit (NPU) or a graphics processing unit (GPU).

It should be noted that, in a physical form, one or more processing units included in the computing device may be encapsulated as a plug-in. The plug-in may access the server in the storage system 100 by using a Universal Serial Bus (USB) or another communication interface.

The client 120 may be an application program running on a physical machine or a virtual machine. The application program may obtain a service request, and send the service request to the storage system.

The client 120 may be a computer running an application program, and the computer running the application program may be a physical machine, or may be a virtual machine. For example, if the computer running the application program is the physical computing device, the physical computing device may be a server or a terminal. The terminal may also be referred to as a terminal device, a user equipment (UE), a mobile station (MS), a mobile terminal (MT), and the like. The terminal may be a mobile phone, a tablet computer, a laptop computer, a desktop personal computer (PC), a personal communication service (PCS) phone, a desktop computer, a virtual reality (VR) terminal device, an augmented reality (AR) terminal device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like. A specific technology and a specific device form used by the client 120 are not limited in embodiments of this disclosure.

The storage system provided in embodiments of this disclosure may be a distributed storage system or a centralized storage system.

In a possible case, the storage system 100 shown in FIG. 1 may be the distributed storage system. As shown in FIG. 1, the distributed storage system provided in this embodiment includes a storage cluster integrating computing and storage. The storage cluster includes one or more servers (for example, the server 110A and the server 110B shown in FIG. 1), and the servers may communicate with each other.

Herein, the server 110A shown in FIG. 1 is used for description. The server 110A is a device that has both a computing capability and a storage capability, for example, a server or a desktop computer. For example, an advanced reduced instruction set computer (RISC) machines (ARM) server or an X86 server may be used as the server 110A herein. In terms of hardware, as shown in FIG. 1, the server 110A includes a processor 112, a memory 113, a network interface card 114, and a hard disk 105. The processor 112, the memory 113, the network interface card 114, and the hard disk 105 are connected through a bus. The processor 112 and the memory 113 are configured to provide a computing resource. Further, the processor 112 is a CPU, and is configured to process a data access request (for example, a log writing request) from outside the server 110A (an application server or another server), and is also configured to process a request generated inside the server 110A. For example, when receiving the log writing request, the processor 112 temporarily stores data of the log writing request in the memory 113. When a total amount of data in the memory 113 reaches a specific threshold, the processor 112 sends the data stored in the memory 113 to the hard disk 105 for persistent storage. In addition, the processor 112 is further configured to calculate or process data, and the like. FIG. 1 shows only one processor 112. In actual application, there are usually a plurality of processors 112, and one processor 112 has one or more CPU cores. A quantity of CPUs and a quantity of CPU cores are not limited in this embodiment.

The memory 113 is an internal memory that directly exchanges data with the processor. The data can be read and written in the memory at a high speed at any time, and the memory serves as a temporary data memory of an operating system or another running program. The memory includes at least two types of memories. For example, the memory may be a random-access memory (RAM) or a read-only memory (ROM). For example, the RAM is a dynamic RAM (DRAM), or a storage class memory (SCM). The DRAM is a semiconductor memory, and is a volatile memory device like most RAMs. The SCM uses a composite storage technology that combines both a conventional storage apparatus feature and a memory feature. The storage class memory can provide a higher read/write speed than the hard disk, but is slower than the DRAM in terms of an access speed and cheaper than the DRAM in terms of costs. However, the DRAM and the SCM are merely examples for description in this embodiment. The memory may further include another RAM, for example, a static RAM (SRAM). For example, the ROM may be a programmable ROM (PROM), an erasable PROM (EPROM), or the like. In addition, the memory 113 may alternatively be a dual in-line memory module or a dual in-line memory module (DIMM), that is, a module including a DRAM, or may be a solid-state drive (SSD). In actual application, a plurality of memories 113 and different types of memories 113 may be configured in the storage server 110A. A quantity and types of the memories 113 are not limited in this embodiment. In addition, the memory 113 may be configured to have a power failure protection function. The power failure protection function means that data stored in the memory 113 is not lost even when the system is powered on again after a power failure. A memory with a power failure protection function is called a non-volatile memory.

The hard disk 105 is configured to provide a storage resource, for example, store data and a write-ahead log. It may be a magnetic disk or another type of storage medium, for example, a solid-state drive or a shingled magnetic recording hard disk. For example, the hard disk 105 may be a solid-state drive based on non-volatile memory host controller interface specification (or Non-Volatile Memory Express (NVMe)), for example, an NVMe SSD.

The network interface card 114 in the server 110A is configured to communicate with the client 120 or another application server (for example, the server 110B shown in FIG. 1).

In an implementation, a function of the processor 112 may be offloaded to the network interface card 114. In other words, in this implementation, the processor 112 does not perform a service data processing operation, but the network interface card 114 completes service data processing, address translation, and another calculation function.

In some application scenarios, the network interface card 114 may also have a persistent memory medium, such as a persistent memory (PM), or a non-volatile RAM (NVRAM), or a phase change memory (PCM). The CPU is configured to perform operations such as address translation and log reading and writing. The memory is configured to temporarily store data to be written into the hard disk 105, or data to be sent to the controller read from the hard disk 105. It may alternatively be a programmable electronic component, for example, a data processing unit (DPU). The DPU has versatility and programmability of the CPU, but is more specialized, and can run efficiently on a network data packet, a storage request, or an analysis request. The DPU is distinguished from the CPU by a high degree of parallelism (where a large quantity of requests needs to be processed). Optionally, the DPU herein may be replaced with a processing chip such as a GPU or an NPU. There is no homing relationship between the network interface card 114 and the hard disk 105. The network interface card 114 may access any hard disk 105 in the server 110B in which the network interface card 114 is located. Therefore, it is convenient to expand a hard disk when storage space is insufficient.

FIG. 1 is merely an example provided in embodiments of this disclosure. The storage system 100 may further include more devices such as servers or memories. A quantity and a specific form of the servers and the memories are not limited in this disclosure.

In another possible case, the storage system provided in embodiments of this disclosure may alternatively be a storage cluster in which computing and storage are separated from each other. The storage cluster includes a computing device cluster and a storage device cluster. The computing device cluster includes one or more computing devices, and the computing devices may communicate with each other. The computing device may be a computing device, for example, a server, a desktop computer, or a controller of a storage array. In terms of hardware, the computing device may include a processor, a memory, a network interface card, and the like. The processor is a CPU, and is configured to process a data access request from outside the computing device or a request generated inside the computing device. For example, when receiving a log writing request sent by a user, the processor temporarily stores a log in the log writing request in the memory. When a total amount of data in the memory reaches a specific threshold, the processor sends the data stored in the memory to a storage device for persistent storage. In addition, the processor is further configured to perform calculation or processing on data, for example, metadata management, deduplication, data compression, virtualized storage space, and address translation.

In an optional implementation, the storage system provided in embodiments of this disclosure may alternatively be a centralized storage system. The centralized storage system features a unified portal, and all data from an external device passes through this portal. The portal is an engine of the centralized storage system. The engine is a core component of the centralized storage system, and many advanced functions of the storage system are implemented in the engine. For example, the engine may have one or more controllers. In a possible example, if the engine has a plurality of controllers, a mirror channel may exist between any two controllers to implement a function of mutual backup, thereby avoiding unavailability of the centralized storage system caused by a hardware fault. The engine further includes a front-end interface and a back-end interface. The front-end interface is configured to communicate with the computing device in the centralized storage system, to provide a storage service for the computing device. The back-end interface is configured to communicate with the hard disk to expand a capacity of the centralized storage system. The engine may connect to more disks through the back-end interface to form a large storage resource pool.

The plurality of memories 113 in the storage system 100 may be virtualized as a memory pool. The memory pool may be configured to temporarily store a cache object in the storage system 100. For example, the cache object is a memory space allocated from the memory pool, and the memory space is provided to be used by a specific type of data.

For example, a cache object may refer to a cache example. A plurality of cache objects may be distinguished from each other based on storage data types of the cache objects, for example, a data read cache, a metadata cache (metadata server cluster (MDS) cache), a file metadata cache, and the like. A memory resource used by the cache object is a page resource (or page). In different services or different workload, memory resources needed by the cache objects are different. The plurality of cache objects may be distinguished from each other based on input/output (I/O) types, for example, a read cache or a write cache.

In embodiments of this disclosure, the cache object is named based on a function of the memory space in the memory pool. However, in some possible cases, if the cache object is named based on a type of a storage medium of the memory space in the memory pool, the cache object may also be referred to as a memory object.

Figure 2:
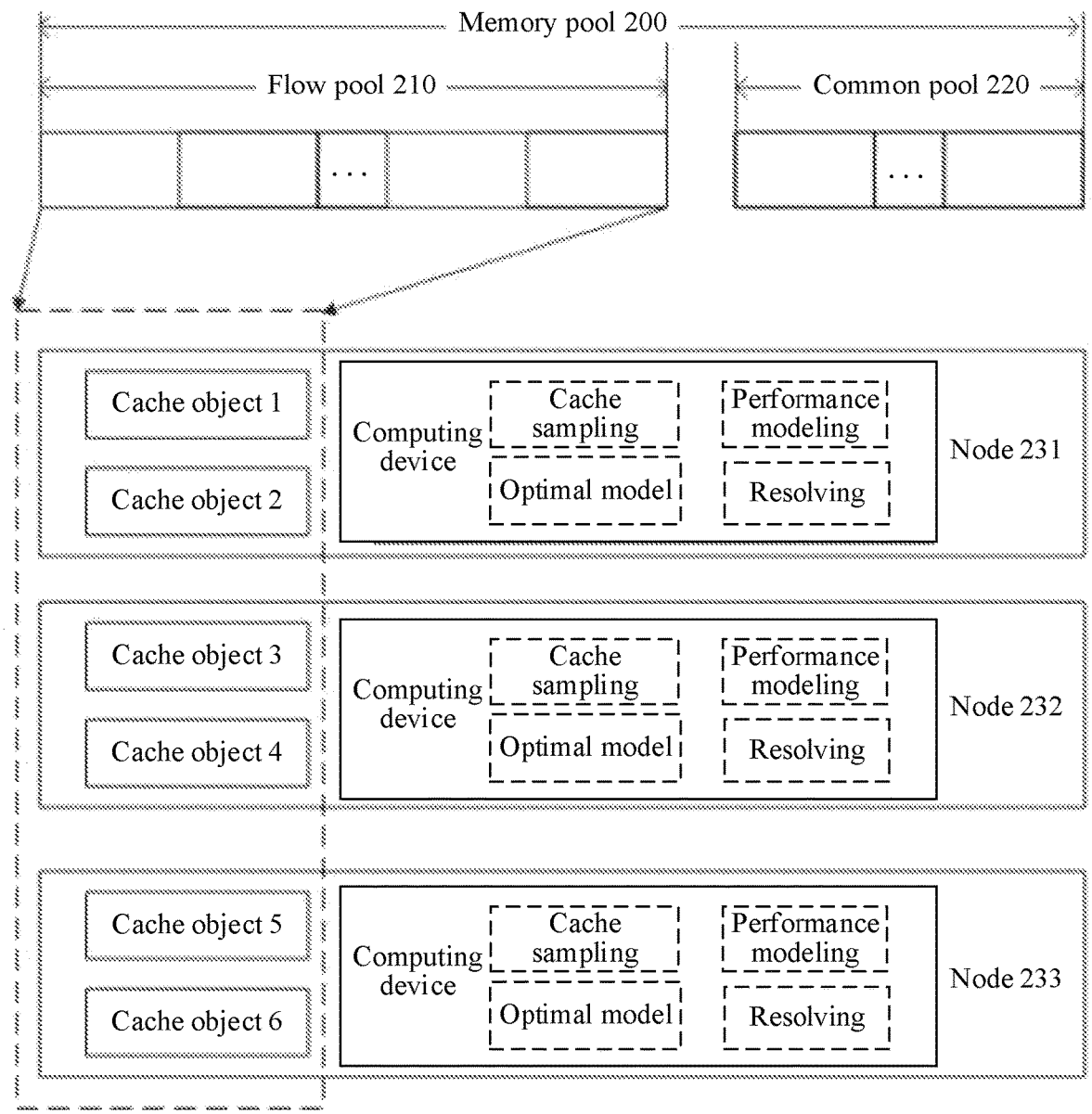
FIG. 2 is a schematic diagram of a memory pool according to this disclosure.

For the memory pool provided in embodiments of this disclosure, this disclosure provides a possible implementation. FIG. 2 is a schematic diagram of a memory pool according to this disclosure. A memory pool 200 may be obtained by virtualizing the plurality of memories 113 shown in FIG. 1. The memory pool 200 includes a flow pool 210 and a common pool 220. The common pool 220 is configured to store a cache object of a server in which the memory is located. The flow pool 210 is configured to store cache objects that are frequently allocated and released in the storage system 100. The flow pool 210 stores a plurality of cache objects (for example, cache objects 1 to 6 shown in FIG. 2). In some possible examples, the flow pool 210 may also be referred to as a page flow pool.

When a watermark occupied by a memory resource in the common pool 220 reaches a specific threshold, a memory object in the common pool 220 may apply to the flow pool 210 for a memory resource, to implement a service of the server. For example, when a used memory resource in the common pool 220 reaches 70%, a new memory resource requirement in the storage system may be met by a memory resource in the flow pool 210.

A node shown in FIG. 2 is a device including a server and a computing device. For example, a node 231 may be a combination of the server 110A and the computing device 130A shown in FIG. 1, and is configured to implement functions of the server 110A and the computing device 130A shown in FIG. 1. The node 231 includes the cache object 1 and a cache object 2 in the flow pool 210. For another example, a node 232 may be a combination of the server 110B and the computing device 130B shown in FIG. 1, and is configured to implement functions of the server 110B and the computing device 130B shown in FIG. 1. The node 232 includes a cache object 3 and a cache object 4 in the flow pool 210.

As shown in FIG. 2, the computing device may include a plurality of components. For example, a cache sampling component may sample a cache object in the memory pool to obtain a reuse distance of the cache object. For another example, a performance modeling component may establish a capacity-performance model of the cache object based on the reuse distance of the cache object. For another example, an optimal model component may obtain a resource allocation model of the memory pool based on a capacity-performance model of each cache object and a weight value of each cache object. The resource allocation model may indicate a correspondence between page resources and hit ratios of all cache objects in the memory pool. For another example, a resolving component may determine the target page resource of the cache object based on the resource allocation model.

It should be noted that the memory pool 200 shown in FIG. 2 is implemented through virtualization of one or more memories in the storage system 100. However, in some possible examples, the memory pool may be alternatively implemented by using another storage medium in the storage system 100, for example, an SSD.

The following describes implementations of embodiments of this disclosure in detail with reference to the accompanying drawings.

Figure 3:
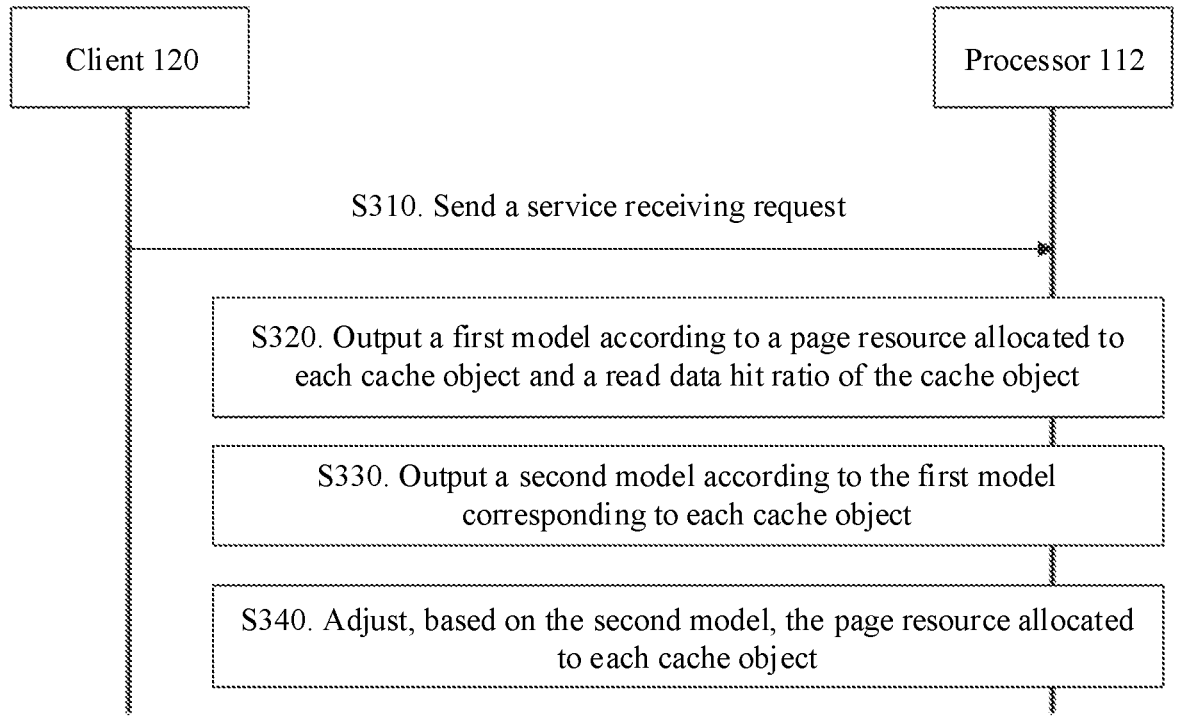
FIG. 3 is a flowchart of a resource allocation method according to this disclosure.

Based on the storage system 100 shown in FIG. 1 and the memory pool 200 shown in FIG. 2, a resource allocation method provided in this disclosure is described. FIG. 3 is a flowchart of the resource allocation method according to this disclosure. A processor 112 shown in FIG. 3 may alternatively be replaced with a computing device (for example, the computing device 130A and the computing device 130B shown in FIG. 1). The resource allocation method includes the following steps S310 to S330.

S310. A client 120 sends a service receiving request to the processor 112.

The service request may be a read I/O request, a write I/O request, or the like.

The service corresponds to a plurality of cache objects in the memory pool of the storage system. As shown in FIG. 2, the service may correspond to some cache objects (for example, the cache objects 1 to 4) in the flow pool 210. A meaning of the "corresponding" may be understood as that a plurality of cache objects need to be accessed for execution of the service. To execute the service request, a plurality of cache objects in the storage system 100 need to be accessed.

FIG. 2 is merely an example provided in this disclosure, and should not be understood as a limitation on this disclosure. A service provided in this disclosure may access more cache objects, for example, a cache object 5 and the cache object 6. A quantity and a type of cache objects corresponding to the service are not limited in this disclosure.

In an optional implementation, if another cache object that is not stored in the memory pool further needs to be accessed for the execution of the foregoing service, the processor 112 may further write the other cache object into the memory pool based on the service request.

For example, cache objects that need to be accessed by the service include a directory entry cache, an index node cache, a data read cache, an MDS cache, and a data write cache. The flow pool in the memory pool includes only the directory entry cache, the index node cache, the data read cache, and the MDS cache. In this case, the processor 112 may further add another cache object to the memory pool based on the service request, and obtain priority information based on all cache objects that need to be accessed by the service in the updated memory pool. The priority information indicates priorities of all the cache objects corresponding to the service.

In a possible case, the processor 112 may further remove a service-irrelevant cache object from the memory pool.

In this way, in the resource allocation method provided in this embodiment of this disclosure, based on the service request, the processor 112 may add a new cache object to the memory pool or remove an old cache object from the memory pool, to avoid that a cache object included in a memory pool in a storage system cannot be added or cancelled in a common technology, thereby implementing dynamic adaptation of the memory pool in the storage system, and improving memory utilization of the storage system.

In an optional case, a process of adding or removing a cache object from the memory pool may alternatively be implemented by the processor 112 based on an extensible cache information configuration request, where the extensible configuration request includes a new cache upper-layer and lower-layer relationship, cache basic parameter information, and the like. The processor 112 may update a relationship between cache objects at layers in the memory based on the extensible cache information configuration request.

S320. The processor 112 outputs a first model based on a page resource allocated to each cache object and a data read hit ratio of the cache object.

The page resource allocated to the cache object is from the memory pool provided by the storage system.

One first model corresponds to one cache object in a plurality of cache objects that need to be accessed by the service, and the first model indicates a page resource that needs to be allocated to the cache object when a specific hit ratio is met.

In a possible case, the first model of the cache object may be created by the processor 112 based on status information of a memory pool. The status information includes at least one of a reuse distance, memory eviction information, and historical information.

The reuse distance is a quantity of other data blocks between two consecutive times of access to a same data block in the cache object. For example, if distribution of data blocks in the cache object is "A-B-C-D-E-A", the reuse distance is 4.

The memory eviction information is information determined by evicting a memory resource occupied by the cache object in the memory pool when the cache object receives an eviction instruction sent by the processor 112. For example, the memory eviction information may indicate that after the cache object evicts a first quantity of page resources, a miss ratio of the cache object changes from a first hit ratio to a second hit ratio, and the second hit ratio is greater than the first hit ratio.

In a possible case, the memory eviction information may alternatively be information about allocating more memory resources to the cache object in the memory pool by the processor 112 when the cache object receives an allocation instruction sent by the processor 112. For example, the memory eviction information may be that after a second quantity of page resources are added to the cache object, the miss ratio of the cache object changes from a third hit ratio to a fourth hit ratio, where the third hit ratio is greater than the fourth hit ratio.

The historical information includes a correspondence that is between a page resource allocated to a cache object and a data read hit ratio of the cache object and that exists in an execution process of a historical service.

In a possible example, the first model of the cache object may be obtained by the processor 112 based on a hit ratio curve or a miss ratio curve (MRC).

Herein, an example in which the first model is obtained by the processor 112 based on the MRC is used for description. A process in which the processor 112 creates the first model includes that the processor 112 creates a first curve based on the reuse distance, the processor 112 creates a second curve based on the memory eviction information, the processor 112 creates a third curve based on the historical information, and the processor 112 creates the first model based on at least one of the first curve, the second curve, and the third curve.

In a possible example, the first curve indicates a correspondence that is between a page resource allocated to the cache object and a data read hit ratio of the cache object and that is obtained according to a first algorithm.

For example, the processor 112 obtains a global MRC (the first curve) of a cache object based on a reuse distance of the cache object, where the global MRC indicates a correspondence that is between a page resource and a miss ratio of the cache object and that is obtained by the processor 112 according to an estimation algorithm in a theoretical calculation process. The reuse distance may be obtained by the processor 112 by performing sampling on the cache object. For a process in which the processor 112 performs sampling on the cache object to obtain the reuse distance and obtains the global MRC by using the reuse distance, refer to related content in a general technology. Details are not described herein again.

As shown in FIG. 2, a cache sampling process may be implemented by a cache sampling component in a computing device.

In another possible example, the second curve indicates a correspondence between a page resource of the cache object and a data read hit ratio after a part of a page resource allocated to the cache object is evicted.

For example, the processor 112 obtains an increment MRC (the second curve) of the cache object based on the memory eviction information of the cache object.

In still another possible example, the second curve indicates a correspondence between a part of a page resource allocated to the cache object and a data read hit ratio.

For example, the processor 112 obtains a feedback MRC (the third curve) of the cache object based on the historical information of the cache object, where the feedback MRC indicates a correspondence that is between a page resource actually occupied by the cache object and a miss ratio and that exists in the service execution process of the cache object. For example, the MDS cache occupies 4 megabyte (MB) page resources, and the miss ratio of the MDS cache is 20%. In some cases, because the feedback MRC is determined based on an observed miss ratio of the cache object in the execution process of the service, the feedback MRC may also be referred to as an observed MRC.

The processor 112 may obtain the first model of the cache object based on at least one of the global MRC, the increment MRC, and the feedback MRC. As shown in FIG. 2, a process of obtaining the first model may be implemented by a performance modeling component in the computing device.

In an optional case, if page resources of cache objects are consistent (that is, sizes of the page resources are the same), and a difference between miss ratios indicated by the global MRC, the increment MRC, and the feedback MRC is greater than or equal to a specific threshold. For example, the miss ratios indicated by the global MRC, the increment MRC, and the feedback MRC are 60%, 55%, and 2% respectively, the processor 112 may temporarily interrupt a process of allocating page resources to some cache objects corresponding to the service, and re-obtain the global MRC, the increment MRC, and the feedback MRC.

It should be noted that the first model may also be referred to as a capacity-performance model of the cache object, and a title of the first model may be slightly different in descriptions of different persons skilled in the art. The title of the first model in this disclosure should not be understood as a limitation on this disclosure.

In a common technical solution, only the foregoing global MRC is configured to determine the first model of the cache object. As a result, in a process in which the cache object executes a service, a miss ratio of the cache object is different from a miss ratio indicated by the global MRC.

In comparison, in the resource allocation method provided in this embodiment of this disclosure. First, the processor 112 may obtain status information of the cache object, where the status information includes a combination of at least one or more of the reuse distance, the memory eviction information, and the historical information. Second, the processor 112 may obtain a plurality of types of MRCs based on the status information, such as the global MRC, the increment MRC, and the feedback MRC above. Finally, the processor 112 obtains the first model of the cache object based on a combination of at least one or more of the global MRC, the increment MRC, and the feedback MRC.

In this way, the processor 112 not only uses a theoretical miss ratio of a cache object having a specific page resource, but also uses the memory eviction information and the historical information of the cache object in the service execution process. This improves accuracy of describing the page resource and the hit ratio (for example, the first model) of the cache object by the processor 112, and improves accuracy of the second model. This helps the processor determine a target page resource of the cache object based on the service request and the second model, thereby improving memory resource utilization and memory resource allocation rationality, and reducing the service processing delay.

To simplify description, in the following content of this specification, an example in which cache objects that need to be accessed by a service include a directory entry cache, an index node cache, a data read cache, and an MDS cache is used for description, and details are not described again subsequently.

In a first possible example, the first model may be represented in a form of a table. Table 1 shows a correspondence between a page resource of an MDS cache and a hit ratio.

TABLE 1

| Page resource | Hit ratio |
|---|---|
| 1024 | 40% |
| 2048 | 65% |
| 3072 | 70% |

Content shown in Table 1 is: If the page resource of the MDS cache is 1024 pages, the hit ratio of the MDS cache is 40%, if the page resource of the MDS cache is 2048 pages, the hit ratio of the MDS cache is 65%, and if the page resource of the MDS cache is 3072 pages, the hit ratio of the MDS cache is 70%. For example, a storage capacity corresponding to one page is 4 kilobytes (kB) or 8 kB.

In a second possible example, a correspondence between the foregoing first models may be represented in a form of a function. For example, the page resource of the MDS cache is in a positive correlation with the hit ratio. A larger quantity of page resources of the MDS cache indicates a higher hit ratio of the MDS cache, but the hit ratio of the MDS cache does not exceed 100%. For example, if Y is the hit ratio, and X is the page resource, the correspondence may be: $Y=1-1/X$ ($X>1$), and $Y=0$ ($0 \leq X \leq 1$). For another example, the correspondence may be: $Y=1-1/\sqrt{X}$($X>1$), and $Y=0$ ($0 \leq X \leq 1$).

Figure 4:
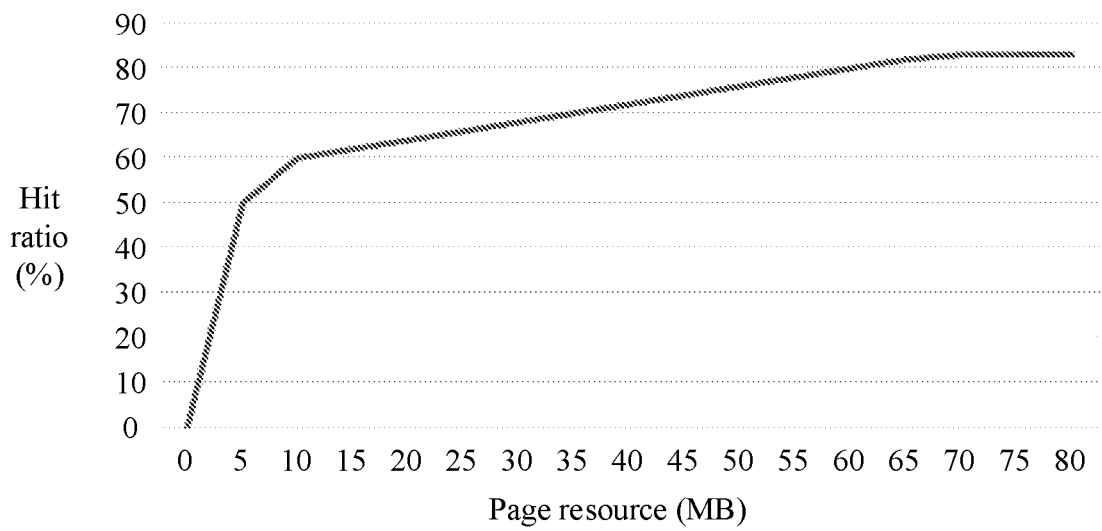
FIG. 4 is a curve diagram of a page resource and a hit ratio according to this disclosure.

In a third possible example, the first model may be represented in a form of a curve chart. FIG. 4 is a curve chart of a page resource and a hit ratio according to this disclosure. A horizontal coordinate of the curve chart (or a polyline chart) is the page resource, a vertical coordinate is the hit ratio, and a unit of the page resource is MB.

The table, the function, and the curve chart (or the polyline chart) are merely representation forms of the first model. The representation forms of the first model in this disclosure are not limited to the foregoing examples. For example, the first model may further include a plurality of functions, parameters of the plurality of functions have constraint information, and the processor performs optimized resolution on the plurality of functions to obtain the page resource of the service.

In this way, in the resource allocation method provided in this embodiment of this disclosure, the processor 112 determines, by using the first model, a page resource that needs to be allocated to the cache object when the hit ratio is met, to avoid a decrease in the hit ratio caused by evicting or allocating resources based on a same proportion by the processor 112. When the cache object that needs to be accessed by the service reaches the hit ratio, an overall hit ratio of the memory pool can be improved as much as possible, thereby reducing the service processing delay.

It should be noted that, in the foregoing examples, the first model is represented by a correspondence between a page resource and a hit ratio. However, in some possible cases, the first model may also be represented by a correspondence between a page resource and a miss ratio.

Still refer to FIG. 3. The resource allocation method provided in this embodiment of this disclosure further includes the following step S330.

S330. The processor 112 outputs a second model based on the first model corresponding to each cache object.

The second model indicates a target page resource to be allocated to each cache object.

In an optional implementation, a process of obtaining the second model by the processor 112 includes that the processor 112 obtains a weight value corresponding to each cache object, where one weight value corresponds to one cache object, and the processor 112 outputs the second model based on the first model corresponding to each cache object and the weight value corresponding to the cache object.

In a possible example, the weight value of each cache object is the same. For example, weight values of a plurality of cache objects corresponding to a service are all 1.

In another possible example, weight values of the cache objects are different. For example, a weight value of the directory entry cache is 4, a weight value of the index node cache is 3, a weight value of the data read cache is 2, and a weight value of the MDS cache is 1.

It should be noted that the foregoing two examples are merely possible implementations provided in this disclosure, and should not be understood as a limitation on this disclosure.

For example, the processor 112 processes each first model and a weight value corresponding to the first model to obtain the foregoing second model. The second model may also be referred to as an optimal model of a plurality of cache objects corresponding to the service. As shown in FIG. 2, a process of obtaining the second model may be implemented by an optimal model component in the computing device.

In a common technical solution, a processor evenly allocates or evicts, based on a remaining resource of the memory pool, memory resources needed by a plurality of cache objects of the service. As a result, a plurality of cache objects having different memory resource requirements are evicted based on a same proportion, and a hit ratio of a cache object with a large memory resource requirement is reduced. Consequently, an overall hit ratio of the memory is reduced, and the service processing delay is increased.

In comparison, in the resource allocation method provided in this embodiment of this disclosure, the processor introduces the second model of the memory pool. The second model indicates the target page resource to be allocated to each cache object. The processor may allocate page resources to a plurality of cache objects corresponding to the service based on the second model, to avoid that the processor allocates or evicts page resources of the cache objects based on a same proportion, thereby improving the overall hit ratio of the memory, and reducing the service processing delay.

It should be noted that the foregoing weight value is determined by the processor 112 based on the service request. However, in some possible examples, the weight value may alternatively be preset by the storage system for the memory pool.

In addition, in an optional implementation, the weight value of the first model may alternatively be updated based on statistical information of some cache objects of the service.

For example, the resource allocation method provided in this embodiment of this disclosure further includes the following steps. First, the processor 112 obtains the statistical information, where the statistical information includes bandwidth and a processing delay of the memory pool, and second, the processor 112 determines, based on the statistical information, a weight value corresponding to each cache object.

In this way, in the resource allocation method provided in this embodiment of this disclosure, the processor 112 may update the second model based on the statistical information of the service executed by the storage system. This helps improve the accuracy of the second model, so that the processor 112 allocates a page resource of the memory pool more properly, thereby improving the overall hit ratio of the memory pool and reducing the service processing delay.

Still refer to FIG. 3. The resource allocation method provided in this embodiment of this disclosure further includes the following step S340.

S340. The processor 112 adjusts, based on the second model, a page resource allocated to each cache object.

Content of the "adjustment" may include an increase of a page resource, a decrease of a page resource, or no change.

In an optional implementation, S340 may include the following process. The processor 112 obtains the first information of each cache object, where the first information indicates at least one of a priority or a hotspot requirement of the cache object, and the processor 112 adjusts, based on the first information and the second model, the page resource allocated to each cache object.

Based on levels of cache objects, a priority order of cache objects is as follows: the file metadata cache>the data read cache>the MDS cache. The MDS cache is used as metadata of the file metadata cache and data read cache. Under a maximum capacity of the file metadata cache or data read cache, the metadata capacity corresponding to the MDS cache is determined by a minimum value of the MDS cache (the minimum value is a minimum memory capacity determined by the processor based on a page resource corresponding to a minimum hit ratio). In addition, an increase in the hit ratio of the file metadata cache or the data read cache can reduce a quantity of read times of the MDS cache. Therefore, priorities of the file metadata cache and the data read cache are higher than that of the MDS cache. In this way, because the file metadata cache stores metadata, the page resource that preferentially satisfying the metadata cache object brings a greater benefit to the memory pool, increases the hit ratio of the cache object in the memory pool, and further improves the overall hit ratio of the memory pool, thereby reducing the service processing delay.

The hotspot requirement may be whether the cache object has a requirement for an increase of a page resource or a requirement for a large page resource. In a resource allocation process, a memory allocation policy of each cache object may be determined based on the hotspot requirement of the cache object, and the memory allocation policy indicates a target page resource and an expected hit ratio of each cache object.

For example, for a plurality of cache objects, such as the file metadata cache, the data read cache, and the MDS cache above, if the plurality of cache objects have hotspot requirements, priorities of the cache objects are shown in Table 2 below.

TABLE 2

| Scenario | MDS cache | File metadata cache | Data read cache |
| --- | --- | --- | --- |
| The data read cache has no hotspot, and the file metadata cache has no hotspot | High | Low | Low |

TABLE 2-continued

| Scenario | MDS cache | File metadata cache | Data read cache |
| --- | --- | --- | --- |
| The data read cache has a hotspot, and the file metadata cache has a hotspot | Low | High | Medium |
| The data read cache has a hotspot, but the file metadata cache has no hotspot | Low | Low | High |
| The data read cache has no hotspot, but the file metadata cache has a hotspot | Low | High | Low |

In a first scenario, because the data read cache has no hotspot and the file metadata cache has no hotspot, the processor 112 may set the data read cache and the file metadata cache to low priorities, and set the MDS cache to a high priority.

In a second scenario, because the data read cache has the hotspot, and the file metadata cache has the hotspot. Therefore, based on levels of cache objects: the file metadata cache>the data read cache>the MDS cache, the processor 112 sets a priority order of the plurality of cache objects to the file metadata cache>the data read cache>the MDS cache.

In a third scenario, because the data read cache has the hotspot and the file metadata cache has no hotspot. The processor 112 may set the MDS cache and the file metadata cache to low priorities, and set the data read cache to a high priority.

In a fourth scenario, because the data read cache has no hotspot and the file metadata cache has the hotspot, the processor 112 may set the MDS cache and the data read cache to low priorities, and set the file metadata cache to a high priority.

The processor 112 may determine priority information of some cache objects of a service based on the levels of cache objects and hotspot requirements of cache objects corresponding to different services. In this way, in a process in which the processor 112 allocates page resources to the cache objects, the processor 112 may preferentially allocate more page resources to a cache object with the hotspot requirement, thereby improving the overall hit ratio of the memory pool and reduce the service processing delay.

It should be noted that the foregoing four scenarios are merely examples provided in this embodiment of this disclosure for describing the hotspot requirement of the cache object. In some possible examples, to improve an overall hit ratio of the cache object that needs to be accessed by the service, the priority information of the cache object that needs to be accessed may further use a simpler or more complex algorithm and design. For example, the processor may further determine a neural network model of the priority information based on historical information of a plurality of services, and determine, by using the neural network model, the priority information of the cache object that needs to be accessed by the current service.

In a possible design, the second model may be established by the processor 112 based on the first model of each cache object and an association relationship (for example, the foregoing weight values and priority information) between the cache objects. A process in which the processor 112 allocates a page resource to a cache object that needs to be accessed by a service may be actually a process of resolving the second model. For example, a resolution equation of the second model is the following equation.

$$\text{Min} \sum_{i=0}^{n} W_i(d_i - x_i) * v_i$$

-continued $$\sum_{i=0}^{n} x_i \leq V$$

$$h(x_i) \geq H_i, \forall i$$

$x_i$ is a memory capacity (or the page resource) that the processor 112 intends to allocate to an $i^{th}$ cache object in the one or more cache objects that need to be accessed by the service, $d_i$ is a hotspot capacity requirement of the $i^{th}$ cache object, vi is an amount of data that can be accommodated or stored on a unit page in the $i^{th}$ cache object, $W_i$ is a weight value of the $i^{th}$ cache object, V is a storage capacity of a memory resource that can be provided by a flow pool in the memory pool, $H_i$ is a minimum hit ratio of the $i^{th}$ cache object, and $h(x_i)$ is an estimated hit ratio of the $i^{th}$ cache object, n indicates a total quantity of the cache objects that need to be accessed by the service.

In the foregoing design, a minimum product of a weight value and a capacity is used as an example to perform resolution in a resolution process of the second model. However, in another possible design, in the resolution process of the second model, resolution may alternatively be performed by using a maximum product of the weight value and an estimated hit ratio. The following equation is an example.

$$\text{Max} \sum_{i=0}^{n} W_i h(x_i)$$

$$\sum_{i=0}^{n} x_i \leq V$$

$$h(x_i) \geq H_i, \forall i$$

$x_i$ is the memory capacity (or page resource) that the processor 112 intends to allocate to the $i^{th}$ cache object in the cache objects that need to be accessed by the service, $W_i$ is the weight value of the $i^{th}$ cache object, V is the storage capacity of the memory resource that can be provided by the flow pool in the memory pool, $H_i$ is the minimum hit ratio of the $i^{th}$ cache object, $h(x_i)$ is the estimated hit ratio of the $i^{th}$ cache object, and n is the total quantity of the cache objects that need to be accessed by the service.

As shown in FIG. 2, the process of resolving the second model may be implemented by a resolution component in the computing device.

In this way, in the resource allocation method provided in this embodiment of this disclosure, the processor uses the first model that indicates the page resource that needs to be allocated to the cache object when the specific hit ratio is met, and determines, based on one or more first models, the second model that indicates the target page resource to be allocated to each cache object. Further, the processor may adjust, based on the second model, the page resource allocated to each cache object.

Because the processor may determine, by using the first model, the page resource needed by each cache object to meet the specific hit ratio, and determine, based on the second model, the target page resource to be allocated to each cache object. This helps the processor determine the target page resource of the cache object based on a service request and the second model, and avoids that the processor evenly allocates or evicts the page resource of the cache object, thereby improving utilization of the page resource in the memory pool, improving allocation rationality of the page resource in the memory pool, and reducing the service processing delay.

In a possible example, the processor 112 may further determine a minimum capacity of the cache object based on the service request. In this way, the processor 112 may determine a minimum hit ratio of each cache object based on the minimum capacity and the first model. The processor 112 may further determine an overall minimum hit ratio of the plurality of cache objects based on the minimum capacity and the second model.

It should be noted that the overall minimum hit ratio may be obtained by performing weighted calculation on a minimum hit ratio of each cache object in the plurality of cache objects.

For example, if the service is a computing service of a neural network model, the computing service corresponds to a plurality of cache objects: a directory entry cache (dentry cache), an index node cache (inode cache), a data read cache, and an MDS cache. The directory entry cache is configured to store file metadata needed by the service, the index node cache is configured to store attribute information of a file needed by the service, the data read cache is configured to store service data needed by the service, and the MDS cache is configured to store metadata of the directory entry cache, index node cache, and data read cache.

The minimum hit ratio of each cache object is shown in Table 3 below.

TABLE 3

| Cache object | Minimum capacity | Minimum hit ratio |
| --- | --- | --- |
| Directory entry cache | 1 MB | 60% |
| Index node cache | 1 MB | 60% |
| Data read cache | 5 MB | 70% |
| MDS cache | 8 MB | 50% |
| Overall | 15 MB | 60% |

It should be noted that, in Table 3, the overall minimum hit ratio is obtained by calculating an average value of the minimum hit ratios of the cache objects. However, in some possible cases, the overall minimum hit ratios may alternatively be obtained through calculation based on a different weight value of each cache object. For example, if the weights of the directory entry cache, index node cache, data read cache, and MDS cache are 4, 3, 2, and 1 respectively, the minimum hit ratio is 60%×4/10+60%×3/10+70%×2/10+50%×1/10=61%. In addition, in a process of determining the overall minimum hit ratio, a weight value of each cache object may be fixed or adjustable. For example, weights of the directory entry cache, the index node cache, the data read cache, and the MDS cache are 1, 2, 3, and 4 respectively.

In the resource allocation method provided in this embodiment of this disclosure, the processor may determine, based on the first model and the second model, the minimum capacity and the minimum hit ratio of the page resource needed by the service request, and allocate the page resource to the cache object. Therefore, in a resource allocation process, a hit ratio decrease caused by evicting or allocating a resource based on a same proportion is avoided, an overall hit ratio of the memory pool is improved, and the service processing delay is reduced.

Figure 5:
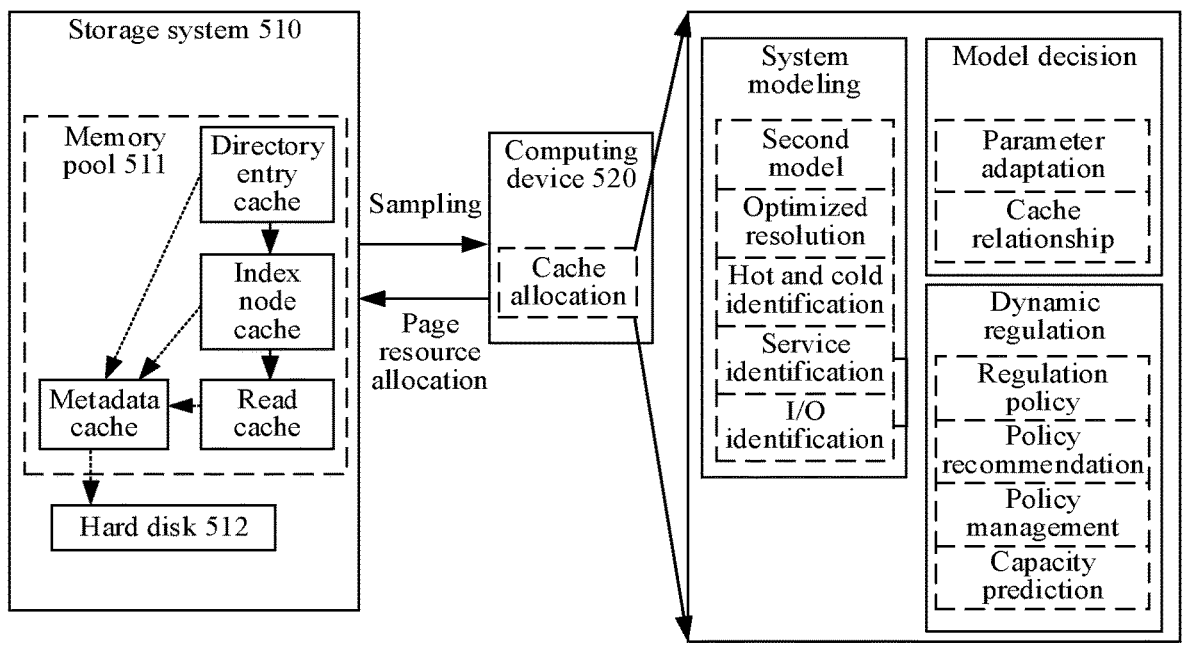
FIG. 5 is a schematic diagram of resource allocation according to this disclosure.

For the foregoing resource allocation method, this disclosure provides a possible complete solution. For example, the processor 112 is the computing device shown in FIG. 1 and cache objects that need to be accessed by the service include the directory entry cache, the index node cache, the data read cache, and the MDS cache. FIG. 5 is a schematic diagram of resource allocation according to this disclosure. A storage system 510 may implement a function of the storage system in the embodiment of the foregoing resource allocation method. The storage system 510 includes a hard disk 512 and a memory pool 511 obtained through virtualization of one or more memories. For hardware implementation of the hard disk 512, refer to related content of the hard disk 105 shown in FIG. 1. For specific implementation of the memory pool 511, refer to related content of the memory pool 200 shown in FIG. 2. Details are not described herein again.

The computing device 520 may implement a function of the processor 112. For example, the computing device 520 may implement a cache allocation function of the memory pool 511 in the storage system 510. For hardware implementation of the computing device 520, refer to the computing device 130A and the computing device 130B shown in FIG. 1. Details are not described herein again.

The resource allocation process shown in FIG. 5 includes the following plurality of processes.

A first process is a system modeling process: The computing device 520 receives a service request, and samples each cache object in the memory pool 511 to obtain a reuse distance, the computing device 520 obtains a first model of each cache object based on the reuse distance and memory eviction information and historical information of the memory pool 511, and the computing device 520 determines an optimal model (for example, the foregoing second model) of the memory pool based on a plurality of first models and weight values.

In a system modeling process, the computing device 520 may further identify a type of a service, determine coldness and hotness of service data of the service, identify I/O data in the storage system 510, and the like.

A second process is a model decision process. The computing device 520 may adjust a weight value and priority information of a cache object that needs to be accessed by the service based on a plurality of parameters (for example, the foregoing second model and the weight values) obtained in the first process, so as to resolve the second model, and obtain a target page resource of the cache object that needs to be accessed by the service. For a process of resolving the optimal model, refer to related descriptions in S330. Details are not described herein again.

A third process is a dynamic decision process. The computing device 520 may generate a regulation policy (for example, a memory allocation policy) based on a resolution result of the optimal model. The regulation policy may indicate a change status of a page resource of a cache object in the memory pool 511, where the change status includes an increase, a decrease, and no change, a specific numerical value of the increase or decrease of the page resource, and the like.

In addition, the computing device 520 may further recommend the regulation policy (a memory allocation policy) and the like for the service based on status information of the memory pool 511.

In a possible case, if the storage system 510 has executed a historical service that is consistent with or similar to the service request, the computing device 520 may further predict, based on an execution status of the historical service, a storage capacity of a cache object that needs to be accessed by the service request.

FIG. 5 is merely a possible solution provided in this embodiment of this disclosure. The memory pool 511 may further include more or fewer cache objects, and the computing device 520 may implement fewer or more functions. This is not limited in this disclosure.

It should be noted that, implementing, by the computing device 520, the resource allocation method provided in this disclosure can reduce consumption of a computing resource in the storage system 510, and improve a data read and write speed of the storage system 510. In addition, because a computing resource of the computing device 520 is adjustable, for example, a user may insert computing devices with different processing capabilities into the storage system 510, compared with the processor in the storage system 510, the computing device 520 may allocate a resource more quickly, thereby reducing time needed for resource allocation and reducing a service processing delay.

It may be understood that, to implement the functions in the foregoing embodiments, the computing device and the storage system include corresponding hardware structures and/or software modules for performing the functions. Persons skilled in the art should be easily aware that, in combination with the units and the method steps in the examples described in the embodiments disclosed in this disclosure, this disclosure can be implemented by using hardware or a combination of hardware and computer software. Whether a function is performed by using hardware or hardware driven by computer software depends on particular application scenarios and design constraints of the technical solutions.

Figure 6:
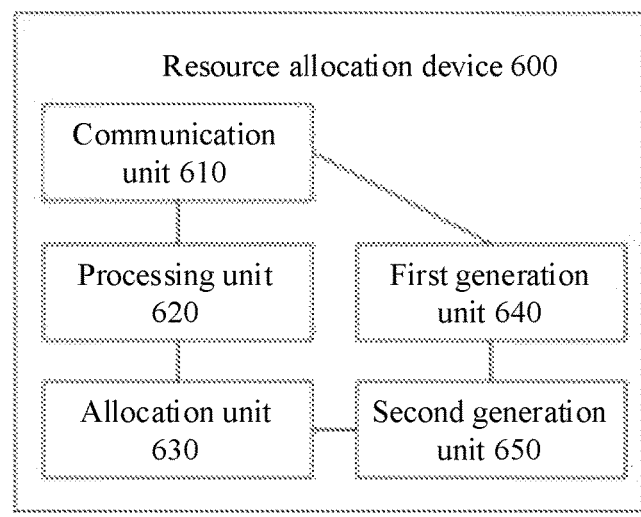
FIG. 6 is a schematic block diagram of a resource allocation device according to this disclosure.
Figure 7:
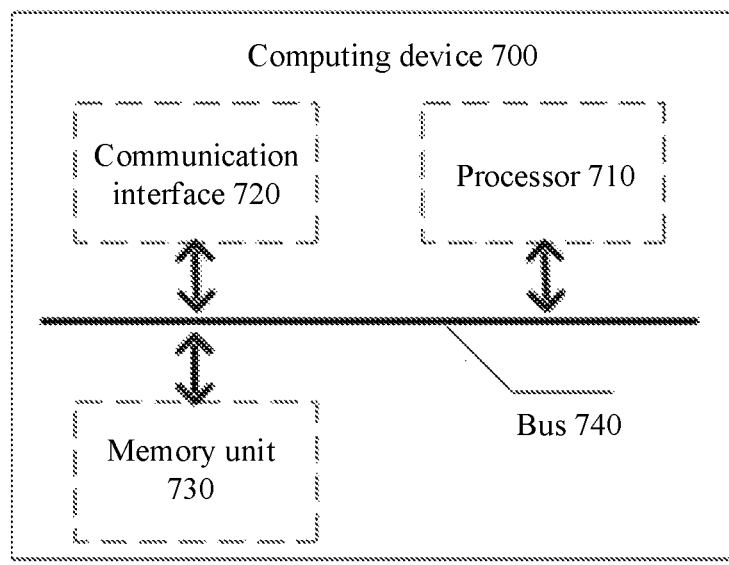
FIG. 7 is a schematic diagram of a structure of a computing device according to this disclosure.

FIG. 6 and FIG. 7 are schematic diagrams of structures of a possible resource allocation device and a possible computing device according to embodiments of this disclosure. The resource allocation device and the computing device may be configured to implement a function of the processor 112 in the foregoing method embodiments, and therefore can also implement beneficial effects of the foregoing method embodiments. In embodiments of this disclosure, the computing device may be the processor 112 shown in FIG. 1, or may be the computing device 130A or the computing device 130B shown in FIG. 1, or may be a module (for example, a chip) used in the storage system 100.

FIG. 6 is a schematic block diagram of a resource allocation device 600 according to this disclosure. The resource allocation device 600 includes a communication unit 610, a processing unit 620, an allocation unit 630, a first generation unit 640, and a second generation unit 650. The resource allocation device 600 may implement a function of the processor shown in FIG. 3 to FIG. 5. It should be understood that only example division of a structure and functional units of the resource allocation device 600 is performed in this embodiment, and no limitation is imposed on specific division of the resource allocation apparatus in this disclosure.

When the resource allocation device 600 is configured to implement the function of the processor 112 in the method embodiment shown in FIG. 3, the communication unit 610 is configured to perform S310, the first generation unit 640 is configured to perform S320, the second generation unit 650 is configured to perform S330, and the allocation unit 630 is configured to perform S340.

The second generation unit 650 may be configured to obtain statistical information of a cache object that needs to be accessed by a service, where the statistical information includes bandwidth and a processing delay of a memory pool, and the processing unit 620 is further configured to update a second model based on the statistical information.

It should be understood that the resource allocation device 600 in this embodiment of this disclosure may be implemented by using an ASIC, or a programmable logic device (PLD). The PLD may be a complex PLD (CPLD), an FPGA, a generic array logic (GAL), or any combination thereof. Alternatively, when the resource allocation methods shown in FIG. 3 to FIG. 5 may be implemented by using software, the resource allocation device 600 and units of the resource allocation device 600 may be software units.

In an optional implementation, the resource allocation device 600 may further include a storage unit. The storage unit may be configured to store process data of resource allocation.

For more detailed descriptions of the resource allocation device 600, directly refer to related descriptions in the embodiments shown in FIG. 3 to FIG. 5. Details are not described herein again.

FIG. 7 is a schematic diagram of a structure of a computing device 700 according to this disclosure. The computing device 700 includes a processor 710 and a communication interface 720. The processor 710 and the communication interface 720 are coupled to each other. It may be understood that the communication interface 720 may be a transceiver or an I/O interface. Optionally, the computing device 700 may further include a memory (or memory unit) 730 configured to store instructions executed by the processor 710, or store input data needed by the processor 710 to run the instructions, or store data generated after the processor 710 runs the instructions.

When the computing device 700 is configured to implement the embodiments shown in FIG. 3 to FIG. 5, the processor 710, the communication interface 720, and the memory 730 may further collaboratively implement operation steps in a resource allocation method performed by nodes in a cluster. The computing device 700 may further perform a function of the resource allocation device 600 shown in FIG. 6. Details are not described herein again.

A specific connection medium between the communication interface 720, the processor 710, and the memory 730 is not limited in this embodiment of this disclosure. In this embodiment of this disclosure, in FIG. 7, the communication interface 720, the processor 710, and the memory 730 are connected by using a bus 740. The bus is represented by a bold line in FIG. 7. A manner of connection between other components is merely an example for description, and does not constitute a limitation. The bus may be classified into an address bus, a data bus, a control bus, and the like. For ease of representation, only one bold line is used for representation in FIG. 7, but this does not mean that there is only one bus or only one type of bus.

The memory 730 may be configured to store a software program and a module, for example, program instructions/a module corresponding to the resource allocation method provided in embodiments of this disclosure. The processor 710 executes the software program and the module stored in the memory 730, to perform various function applications and data processing. The communication interface 720 is configured to perform signaling or data communication with another device. In this disclosure, the computing device 700 may have a plurality of communication interfaces 720.

In a possible example, the memory 730 may be, but is not limited to, a volatile memory or a non-volatile memory, or may include both a volatile memory and a non-volatile memory. The non-volatile memory may be a ROM, a PROM, an EPROM, an electrically EPROM (EEPROM), or a flash memory. The volatile memory may be a RAM, and serves as an external cache. By way of example, and not limitation, many forms of RAMs are available, such as an SRAM, a DRAM, a synchronous DRAM (SDRAM), a double data rate (DDR) SDRAM, an enhanced SDRAM (ESDRAM), a synchlink DRAM (SLDRAM), and a direct Rambus (DR) RAM.

It may be understood that the processor in embodiments of this disclosure may be a CPU, an NPU, or a GPU, or may be another general-purpose processor, a DSP, an ASIC, an FPGA or another programmable logic device, a transistor logic device, a hardware component, or any combination thereof. The general-purpose processor may be a microprocessor or any regular processor.

The method steps in embodiments of this disclosure may be implemented in a hardware manner, or may be implemented in a manner of executing software instructions by the processor. The software instructions include a corresponding software module. The software module may be stored in a RAM, a flash memory, a ROM, a PROM, an EPROM, an EEPROM, a register, a hard disk, a removable hard disk, a compact disc (CD) ROM (CD-ROM), or a storage medium of any other form known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in the network device or the terminal device. Certainly, the processor and the storage medium may alternatively exist as discrete components in the network device or the terminal device.

All or some of the foregoing embodiments may be implemented by using software, hardware, firmware, or any combination thereof. When software is configured to implement the embodiments, all or some of the embodiments may be implemented in a form of a computer program product. The computer program product includes one or more computer programs and instructions. When the computer programs or instructions are loaded and executed on a computer, all or some of the procedures or functions in embodiments of this disclosure are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, or may be an optical medium, for example, a digital video disc (DVD), or may be a semiconductor medium, for example, an SSD.

In this specification, the claims, and the accompanying drawings of this disclosure, the terms "first", "second", "third", and the like are intended to distinguish between different objects but do not limit a particular order.

In addition, in embodiments of this disclosure, the word "example" or "for example" represents giving an example, an illustration, or a description. Any embodiment or design scheme described as an "example" or "for example" in embodiments of this disclosure should not be explained as being more preferred or having more advantages than another embodiment or design scheme. Exactly, use of the word "example", "for example", or the like is intended to present a related concept in a specific manner.

In this disclosure, "at least one" refers to one or more, "a plurality of" refers to two or more, and another quantifier is similar. The term "and/or" describes an association relationship between associated objects and indicates that three relationships may exist. For example, A and/or B may indicate the following three cases: only A exists, both A and B exist, and only B exists. In addition, an element that appears in singular forms "a", "an", and "the" does not mean "one or only one" unless otherwise specified in the context, but means "one or more". For example, "a device" means one or more such devices. Furthermore, "at least one of . . . " means one or any combination of subsequent associated objects. For example, "at least one of A, B, and C" includes A, B, C, AB, AC, BC, or ABC. In the text descriptions of this disclosure, the character "/" generally indicates an "or" relationship between the associated objects. In a formula in this disclosure, the character "/" indicates a "division" relationship between the associated objects.

In embodiments of this disclosure, unless otherwise stated or there is a logic conflict, terms and/or descriptions between different embodiments are consistent and may be mutually referenced, and technical features in different embodiments may be combined into a new embodiment based on an internal logical relationship thereof.

It may be understood that various numbers in embodiments of this disclosure are merely used for differentiation for ease of description, and are not used to limit the scope of embodiments of this disclosure. The sequence numbers of the foregoing processes do not mean execution sequences, and the execution sequences of the processes should be determined based on functions and internal logic of the processes.

What is claimed is:

1. A method implemented by one or more processors, comprising:
    outputting first models of first cache objects based on status informations of the first cache objects, wherein the status informations comprise historical information and at least one of a reuse distance information or a memory eviction information, wherein the historical information comprises a correspondence that is between a page resource allocated to each of the first cache objects and a first data read hit ratio of each of the first cache objects and that exists in an execution process of a historical service, wherein the reuse distance information indicates a quantity of other data blocks between two consecutive accesses to a same data block in the first cache objects, wherein the memory eviction information indicates changes in hit ratios of the first cache objects under a condition of evicting partial page resources, and wherein the first models indicate sizes of first page resources to be allocated to the first cache objects respectively when the first cache objects meet various hit ratios;
    outputting a second model based on the first models, wherein the second model indicates a target page resource to be allocated to each of the first cache objects; and
    adjusting the first page resources based on the second model.

2. The method of claim 1, wherein each of the first cache objects is a memory space allocated from a memory pool of a storage system, and wherein the memory space is for a specific type of data.

3. The method of claim 1, wherein outputting the second model comprises:
    obtaining weight values corresponding to the first cache objects; and
    outputting the second model based on the weight values.

4. The method of claim 3, wherein obtaining the weight values comprises:
    obtaining statistical information comprising bandwidth and a processing delay of a memory pool; and
    obtaining the weight values based on the statistical information.

5. The method of claim 1, wherein outputting each of the first models comprises:
    creating a first curve based on the reuse distance information, wherein the first curve indicates a second correspondence that is between second page resources allocated to the first cache objects and a second data read hit ratio and that is based on a first algorithm;
    creating a second curve based on the memory eviction information, wherein the second curve indicates a third correspondence between third page resources of the first cache objects and a third data read hit ratio after a part of the second page resources are evicted;
    creating a third curve based on the historical information; and
    creating the first models based on at least one of the first curve, the second curve, or the third curve.

6. The method of claim 1, wherein adjusting the first page resources comprises:
    obtaining first informations of each of the first cache objects, wherein the first informations indicate at least one of a priority or a hotspot requirement of each of the first cache objects; and
    further adjusting the first page resources based on the first information.

7. The method of claim 1, further comprising:
    obtaining a service request, wherein a second cache object for the service request comprises a third cache object unavailable in a memory pool; and
    writing the third cache object into the memory pool based on the service request.

8. A device comprising:
    a memory configured to store instructions; and
    one or more processors coupled to the memory and configured to execute the instructions to cause the device to:
        output first models of first cache objects based on status informations of the first cache objects, wherein the status informations comprise historical information and at least one of a reuse distance information or a memory eviction information, wherein the historical information comprises a correspondence that is between a page resource allocated to each of the first cache objects and a first data read hit ratio of each of the first cache objects and that exists in an execution process of a historical service, wherein the reuse distance information indicates a quantity of other data blocks between two consecutive accesses to a same data block in the first cache objects, wherein the memory eviction information indicates changes in hit ratios of the first cache objects under a condition of evicting partial page resources, and wherein the first models indicate sizes of first page resources to be allocated to the first cache objects respectively when the first cache objects meet various hit ratios;

output second models based on the first models, wherein the second models indicate target page resources to be allocated to each of the first cache objects; and adjust the first page resources based on the second models.

9. The device of claim 8, wherein each of the first cache objects is a memory space allocated from a memory pool of a storage system, and the memory space is for a specific type of data.

10. The device of claim 8, wherein the one or more processors are further configured to execute the instructions to cause the device to:

obtain weight values corresponding to the first cache objects, wherein one weight value corresponds to one first cache object; and output the second models based on the weight values.

11. The device of claim 10, wherein the one or more processors are further configured to execute the instructions to cause the device to:

obtain statistical information comprising bandwidth and a processing delay of a memory pool; and obtain the weight values based on the statistical information.

12. The device of claim 8, wherein the one or more processors are further configured to execute the instructions to cause the device to:

create a first curve based on the reuse distance information, wherein the first curve indicates a second correspondence that is between fourth second page resources allocated to each of the first cache objects and a second data read hit ratio and that is obtained according to a first algorithm;

create a second curve based on the memory eviction information, wherein the second curve indicates a third correspondence between third page resources of each of the first cache objects and a third data read hit ratio after a part of the second page resources is evicted;

create a third curve based on the historical information; and create each of the first models based on at least one of the first curve, the second curve, or the third curve.

13. The device of claim 8, wherein the one or more processors are further configured to execute the instructions to cause the device to:

obtain first informations of each of the first cache objects, wherein the first informations indicate at least one of a priority or a hotspot requirement of each of the first cache objects; and further adjust the first page resources based on the first information.

14. The device of claim 8, wherein the one or more processors are further configured to execute the instructions to cause the device to:

obtain a service request, wherein a second cache object for the service request comprises a third cache object unavailable in a memory pool; and write the third cache object into the memory pool based on the service request.

15. A computer program product comprising computer-executable instructions that are stored on a non-transitory computer-readable storage medium and that, when executed by one or more processors, cause a device to:

output first models of first cache objects based on status informations of the first cache objects, wherein the status informations comprise historical information and at least one of a reuse distance information or a memory eviction information, wherein the historical information comprises a correspondence that is between a page resource allocated to each of the first cache objects and a first data read hit ratio of each of the first cache objects and that exists in an execution process of a historical service, wherein the reuse distance information indicates a quantity of other data blocks between two consecutive accesses to a same data block in the first cache objects, wherein the memory eviction information indicates changes in hit ratios of the first cache objects under a condition of evicting partial page resources, and wherein the first models indicate sizes of first page resources to be allocated to the first cache objects respectively when the first cache objects meet various hit ratios;

output second models based on the first models, wherein the second models indicate target page resources to be allocated to each of the first cache objects; and adjust the first page resources based on the second models.

16. The computer program product of claim 15, wherein each of the first cache objects is a memory space allocated from a memory pool, and wherein the memory space is for a specific type of data.

17. The computer program product of claim 15, wherein the computer-executable instructions further cause the device to:

obtain weight values corresponding to the first cache objects, wherein one weight value corresponds to one first cache object; and further output the second models based on the weight values.

18. The computer program product of claim 17, wherein the computer-executable instructions further cause the device to:

obtain statistical information comprising bandwidth and a processing delay of a memory pool; and obtain the weight values based on the statistical information.

19. The computer program product of claim 15, wherein the computer-executable instructions further cause the device to:

obtain first informations of each of the first cache objects, wherein the first informations indicate at least one of a priority or a hotspot requirement of each of the first cache objects; and further adjust the first page resources based on the first information.

20. The computer program product of claim 15, wherein the computer-executable instructions further cause the device to:

obtain a service request, wherein a second cache object for the service request comprises a third cache object unavailable in a memory pool; and write the third cache object into the memory pool based on the service request.

* * * * *